C. D. STANFORD.
AUTOMOBILE SEAT ATTACHMENT.
APPLICATION FILED MAR. 10, 1917.
1,252,192.
Patented Jan. 1, 1918.
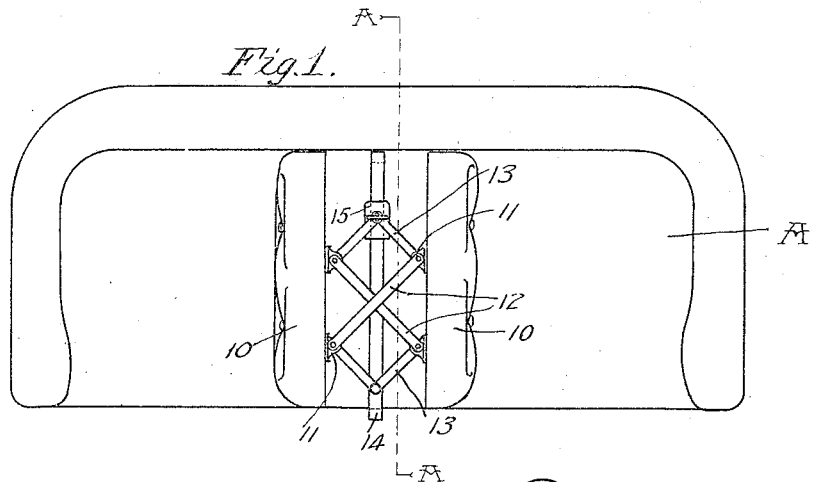
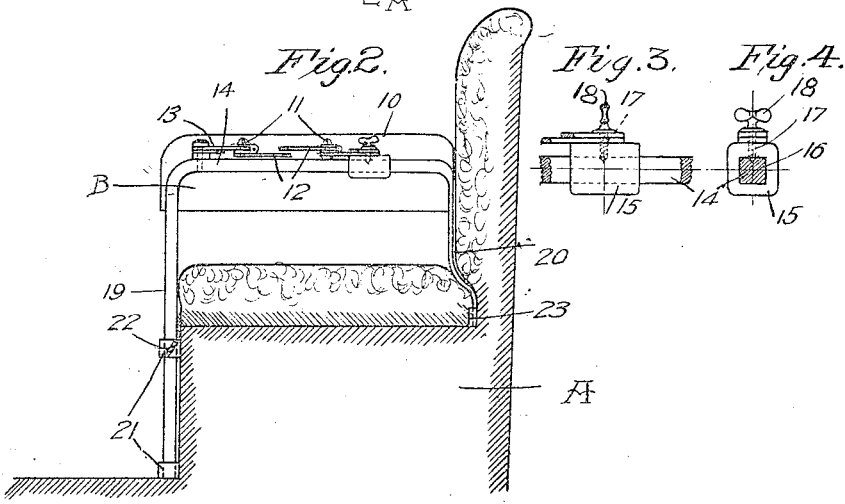
INVENTOR
C. D. Stanford,
BY Victor J. Evans.
ATT.

UNITED STATES PATENT OFFICE.

CHARLES D. STANFORD, OF BANGOR, MAINE.

AUTOMOBILE-SEAT ATTACHMENT.

1,252,192.  Specification of Letters Patent.  Patented Jan. 1, 1918.

Application filed March 10, 1917. Serial No. 153,883.

*To all whom it may concern:*

Be it known that I, CHARLES D. STANFORD, a citizen of the United States of America, residing at Bangor, in the county of Penobscot and State of Maine, have invented new and useful Improvements in Automobile-Seat Attachments, of which the following is a specification.

This invention relates to vehicle seat attachments, and more particularly to seat attachments for automobiles, to be applied to automobile seats.

It is well-known, that automobile seats of the present day construction, are made to accommodate three people usually, and when only one or two people are occupying the same, they are very uncomfortably jostled about, due to the fact that there are no side supports in the seat. Of course, it is understood, that some cars are provided with a stationary partition between the seats, but in this type of car three people can not be comfortably seated, therefore, I aim to provide a removable spacing element which can be applied when one or two people are using the car.

The primary object of the invention is the provision of an attachment of the character described, which is adapted to be removably secured to the seat of an automobile or other vehicle, which when applied will serve to divide the seat into several compartments so as to prevent undue jostling of the occupants thereof.

Another object of the invention, is the provision of the seat attachment which comprises two members, the same being adjustable with relation to each other in order that the compartments may be varied in width.

A further object is the provision of a seat attachment of the class described, which will provide an arm rest between the occupants therein, thereby making the seats much more comfortable and restful, especially in case of a long drive.

A further object is the provision of a seat attachment of the class described, which may be folded upon itself, so as to take up a minimum amount of space when in such condition, in order that the same may be stored either in the vehicle or any other space available.

A further object of the invention is the provision of a seat attachment of the class described, which is adapted to be adjusted vertically to accommodate itself to the person or persons using the same.

A still further object of the invention is the provision of an article of the class described which is of very simple construction, thoroughly reliable and efficient in its operation, inexpensive to manufacture and readily adapted to any style of automobile or other vehicle.

Other objects and advantages will be more apparent when the nature and operation of the device is understood from the description and claims taken in connection with the accompanying drawings of which:

Figure 1 is a plan view of an automobile seat, with the attachment mounted thereon.

Fig. 2, is a vertical sectional view through the seat and attachment.

Figs. 3 and 4 are detail views.

In the drawings A, represents a conventional form of an automobile seat and B, the attachment which is adapted to be applied thereto. The attachment comprises a pair of identically constructed cushion members 10—10, the opposing faces of which are provided with outwardly extending lugs 11, to which are pivotally secured the links 12—12 and 13—13. The links 13, which are disposed toward the front of the seat are pivoted to the supporting bar 14, while the links 13, which are disposed toward the rear of the seat are pivoted to the sliding member 15. Said member 15, is of substantially rectangular formation and provided with a squared opening 16, which is adapted to receive the bar 14, for sliding movement thereon. The top face of the member 15, is provided with a threaded opening 17, which is adapted to receive the set screw 18, for locking said member 15, in its adjusted positions, said screw being also adapted to pivotally secure the links 13, at the rear of said seat to the member 15. The supporting bar 14, is provided with the downwardly extending legs 19, and 20, the former being substantially longer than the latter and disposed in advance of the front of the seat. Secured to the forward portion of the seat below the cushion thereof are a plurality of bearing members or guides 21, which are adapted to receive the legs 19. Set screws 22, are provided for locking said leg in its vertically adjusted positions. The rear leg 20, is bent slightly outward at its lower portion and adapted to be engaged in the socket bearing 23.

In operation of the device the legs 19 and 20, are inserted in their respective bearings, and the said screws 22, of the bearings 21, operated to lock the attachment when it is adjusted to the vertical position desired. The cushion members 10—10, are then adjusted with relation to each other as desired and the set screw 18 is operated to lock the same in their adjusted position. It will thus be seen, that the device is readily and easily attached or detached from the seat and easily adjusted horizontally.

It is thought from the foregoing description that the nature, purpose, and operation of the device will be readily understood by those skilled in the art to which the invention appertains, and therefore a more extended description is omitted.

What is claimed is:—

1. In combination with the seat of a vehicle of a spacing attachment comprising, a pair of cushion members, adjustably related to each other, means for locking said members in their adjusted positions, a supporting member adapted to be removably and adjustably secured to the seat and means for locking the same in its vertically adjusted positions.

2. In combination with the seat of a vehicle of a spacing attachment, comprising a substantially U shaped supporting member adjustable vertically, means for locking the same in its adjusted position, a pair of cushion spacing members adjustable relative to each other, and means for locking said cushion members in their adjusted positions.

3. In combination with the seat of a vehicle of a spacing attachment comprising, a vertically adjustable U shaped supporting member, guide bearings attached to said seat to receive the legs of said supporting member, means mounted on said guide bearings for locking the supporting member in its vertically adjusted positions, a pair of substantially rectangular cushion members, bearings provided upon the opposed faces of said cushion members, links pivotally connected to said bearings, two of the end links connected pivotally to the supporting member, a slide mounted on the supporting member, the two remaining end links pivoted to said slide and means for locking said slide to said supporting member.

In testimony whereof I affix my signature.

CHARLES D. STANFORD.

Witness:
H. E. COLLETT.